United States Patent
Colven et al.

(10) Patent No.: US 7,526,197 B2
(45) Date of Patent: Apr. 28, 2009

(54) UTILIZING THE PROTECTING BANDWIDTH IN A SONET NETWORK

(75) Inventors: David Michael Colven, Dallas, TX (US); Roy McNeil, Warwick, NY (US); Stephen Joseph Brolin, Livingston, NJ (US)

(73) Assignee: Fujitsu Limited, Kawasaki (JP)

( * ) Notice: Subject to any disclaimer, the term of this patent is extended or adjusted under 35 U.S.C. 154(b) by 387 days.

(21) Appl. No.: 10/745,560

(22) Filed: Dec. 29, 2003

(65) Prior Publication Data

US 2005/0147409 A1 Jul. 7, 2005

(51) Int. Cl.
*H04B 14/00* (2006.01)

(52) U.S. Cl. .................... 398/5; 398/3; 398/19

(58) Field of Classification Search ............... 398/1–5, 398/10, 12, 17, 19, 21
See application file for complete search history.

(56) References Cited

U.S. PATENT DOCUMENTS

| | | | |
|---|---|---|---|
| 6,940,808 B1 * | 9/2005 | Shields et al. | 370/216 |
| 6,950,391 B1 * | 9/2005 | Zadikian et al. | 370/219 |
| 6,967,948 B2 * | 11/2005 | Iacovino et al. | 370/384 |
| 7,130,264 B2 * | 10/2006 | Wiebe et al. | 370/225 |
| 2002/0131431 A1 * | 9/2002 | Wank et al. | 370/403 |

* cited by examiner

*Primary Examiner*—Dzung D Tran
(74) *Attorney, Agent, or Firm*—Hanify & King, PC (57) ABSTRACT

A system provides more cost and bandwidth efficient utilization of a SONET network having both a Working path and a Protection path by using both communication paths to carry data. A system for communicating data over a Synchronous Optical Network/Synchronous Digital Hierarchy, the system comprises an Optical Line Termination unit operable to interface with a plurality of Synchronous Optical Network/Synchronous Digital Hierarchy communication paths, and communicate different data on each of the plurality of Synchronous Optical Network/Synchronous Digital Hierarchy communication paths.

4 Claims, 9 Drawing Sheets

**STS-1-*X*v SPE structure**

Fig. 7

**STS-3c-*X*v SPE structure**

Fig. 8

STS-1-Xv SPE multiframe and sequence indicator

Fig. 9

| BIT1 | BIT 2 | BIT3 | BIT 4 | BIT 5 | BIT 6 | BIT 7 | BIT 8 | 1ST MF NO. | 2ND MF NO. |
|---|---|---|---|---|---|---|---|---|---|
| H4 BYTE | | | | 1ST MF IND. MFI1 (BITS 1-4) | | | | | |
| SEQUENCE INDICATOR MSBS (BITS 1-4) | | | | 1 | 1 | 1 | 0 | 14 | N-1 |
| SEQUENCE INDICATOR LSBS (BITS 5-8) | | | | 1 | 1 | 1 | 1 | 15 | |
| 2ND MULTIFRAME INDICATOR MFI2 MSBS (BITS 1-4) | | | | 0 | 0 | 0 | 0 | 0 | N |
| 2ND MULTIFRAME INDICATOR MFI2 LSBS (BITS 5-8) | | | | 0 | 0 | 0 | 1 | 1 | |
| CTRL | | | | 0 | 0 | 1 | 0 | 2 | |
| GID | | | | 0 | 0 | 1 | 1 | 3 | |
| RESERVED ("0000") | | | | 0 | 1 | 0 | 0 | 4 | |
| RESERVED ("0000") | | | | 0 | 1 | 0 | 1 | 5 | |
| CRC-8 | | | | 0 | 1 | 1 | 0 | 6 | |
| CRC-8 | | | | 0 | 1 | 1 | 1 | 7 | |
| MEMBER STATUS | | | | 1 | 0 | 0 | 0 | 8 | |
| MEMBER STATUS | | | | 1 | 0 | 0 | 1 | 9 | |
| RS-ACK | | | | 1 | 0 | 1 | 0 | 10 | |
| RESERVED ("0000") | | | | 1 | 0 | 1 | 1 | 11 | |
| RESERVED ("0000") | | | | 1 | 1 | 0 | 0 | 12 | |
| RESERVED ("0000") | | | | 1 | 1 | 0 | 1 | 13 | |
| SEQUENCE INDICATOR SQ MSBS (BITS 1-4) | | | | 1 | 1 | 1 | 0 | 14 | |
| SEQUENCE INDICATOR SQ LSBS (BITS 5-8) | | | | 1 | 1 | 1 | 1 | 15 | |
| 2ND MULTIFRAME INDICATOR MFI2 MSBS (BITS 1-4) | | | | 0 | 0 | 0 | 0 | 0 | N+1 |
| 2ND MULTIFRAME INDICATOR MFI2 LSBS (BITS 5-8) | | | | 0 | 0 | 0 | 1 | 1 | |
| CTRL | | | | 0 | 0 | 1 | 0 | 2 | |
| GID | | | | 0 | 0 | 1 | 1 | 3 | |
| RESERVED ("0000") | | | | 0 | 1 | 0 | 0 | 4 | |
| RESERVED ("0000") | | | | 0 | 1 | 0 | 1 | 5 | |
| CRC-8 | | | | 0 | 1 | 1 | 0 | 6 | |
| CRC-8 | | | | 0 | 1 | 1 | 1 | 7 | |
| MEMBER STATUS | | | | 1 | 0 | 0 | 0 | 8 | |

STS-1-Xv sequence and multiframe indicator H4 coding

UTILIZING THE PROTECTING BANDWIDTH IN A SONET NETWORK

FIELD OF THE INVENTION

The present invention relates to system that provides the capability to utilize the protecting bandwidth in a SONET network for working traffic while still providing a degraded mode of operation in the case of path failure.

BACKGROUND OF THE INVENTION

Optical networks have become a standard technology for the transport of information in the telecommunications industry. A number of different optical network standards have been defined, with each having advantages and disadvantages for different uses. Synchronous optical network (SONET) is one standard for optical telecommunications transport. SONET is expected to provide the transport infrastructure for worldwide telecommunications for at least the next two or three decades. The increased configuration flexibility and bandwidth availability of SONET provides significant advantages over the older telecommunications system, such as reduction in equipment requirements, increase in network reliability, ability to carry signals in a variety of formats, a set of generic standards that enable products from different vendors to be connected, and a flexible architecture capable of accommodating future applications, with a variety of transmission rates. SONET is often used for long-haul, metro level, and access transport applications.

One common feature of a SONET network is the provision of two independent optical fiber communication paths between any two points. One fiber communication path is known as the Working path and the other fiber path is known as the Protection path. Signals are input to and output from the Working and Protection paths using multiplexing circuits, which provides the interfaces between the different network signals and SONET signals. The main advantage of this arrangement is its survivability; if a fiber path is cut, the multiplexers have the intelligence to send the services affected via an alternate path without interruption. For example, is signals are being sent over the Working path and the Working path is cut, the signals may be sent over the Protection path without loss of service.

A problem that arises with SONET networks having both a Working path and a Protection path is that the bandwidth of the path that is not being used is essentially wasted. For some applications of a SONET network, the protection from service interruption may be worth the expense and complexity of supporting the path having the wasted bandwidth. However, for many applications a need arises for a more cost and bandwidth efficient technique.

SUMMARY OF THE INVENTION

The present invention is a system that provides more cost and bandwidth efficient utilization of a SONET network having both a Working path and a Protection path by using both communication paths to carry data. This provides an increase in normal network capacity, by using the wasted bandwidth of the normally unused communication path. Should one communication path fail, the other communication path is still capable of carrying the network traffic at 50% bandwidth, which provides a 50% protected mode, which is advantageously applied, particularly to a data service.

In one embodiment of the present invention, a system for communicating data over a Synchronous Optical Network/Synchronous Digital Hierarchy, the system comprises an Optical Line Termination unit operable to interface with a plurality of Synchronous Optical Network/Synchronous Digital Hierarchy communication paths, and communicate different data on each of the plurality of Synchronous Optical Network/Synchronous Digital Hierarchy communication paths. The plurality of Synchronous Optical Network/Synchronous Digital Hierarchy communication paths may comprise a working path and a protection path. The different data may be communicated on the working path and on the protection path using virtual concatenation.

In one aspect of the present invention, the Optical Line Termination unit is further operable to detect a break in one of the plurality of Synchronous Optical Network/Synchronous Digital Hierarchy communication paths, and communicate data on each remaining good Synchronous Optical Network/Synchronous Digital Hierarchy communication path. The plurality of Synchronous Optical Network/Synchronous Digital Hierarchy communication paths may comprise a working path and a protection path. The data may be communicated on the remaining good not using virtual concatenation.

In one aspect of the present invention, the Optical Line Termination unit is further operable to detect that one of the plurality of Synchronous Optical Network/Synchronous Digital Hierarchy communication paths that was broken has been restored, and communicate different data on each of the plurality of Synchronous Optical Network/Synchronous Digital Hierarchy communication paths. The plurality of Synchronous Optical Network/Synchronous Digital Hierarchy communication paths may comprise a working path and a protection path. The different data may be communicated on the working path and on the protection path using virtual concatenation.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides the capability for using both a Working path and a Protection path of a SONET or SDH network to carry data, which provides more cost and bandwidth efficient utilization of the SONET network. This provides an increase in normal network capacity, by using the wasted bandwidth of the normally unused communication path. Should one communication path fail, the other communication path is still capable of carrying the network traffic at 50% bandwidth, which provides a 50% protected mode, which is advantageously applied, particularly to a data service.

For example, in the normal mode of operation, when both the working and protection paths are available, the network frames are sent on both communication paths one byte at a time. This aspect is the standard virtual concatenation approach usually used to combine two SONET channels on the same fiber communication path into one. The present invention, however, uses different fiber communication paths. When a communication path breaks, the fact is noted at the receiving end through AIS or LOS. The receiver then informs the sender of this fact using the LCAS protocol. The sender no longer uses Virtual Concatenation and sends frames only on the remaining operational link. The data rate is now half what it was and remains that way until the link is repaired.

As an example of one embodiment of the present invention, normally if a 100 Mbit Ethernet service is mapped onto a SONET STS1, it gets approx. 50 Mbit/sec or half line rate. However, with the present invention it would get 2 * STS1 (one in each direction) or about 100 Mbit/sec full line rate. If one of the fibers were to break then the bandwidth would be 1 STS1 or about 50 Mbit/sec. Therefore, even in the broken mode the capacity is as good as for the "normal" STS1 type mapping. However, when both communication paths are available twice the bandwidth is provided. For a typical system, one of the communication paths is broken for only for a small number of minutes a year, and for the remainder of the time the present invention provides twice the bandwidth as standard SONET methods. In addition even though on average the availability of both communication paths is high if one does break it can take up to four hours to fix. Therefore, another advantage of the present invention is that data service can remain operational (in a degraded mode) during this time period.

Synchronous Optical Network (SONET) is a standard for connecting fiber-optic transmission systems. SONET was proposed by Bellcore in the middle 1980s and is now an ANSI standard. SONET defines interface standards at the physical layer of the OSI seven-layer model. The standard defines a hierarchy of interface rates that allow data streams at different rates to be multiplexed. SONET establishes Optical Carrier (OC) levels from 51.8 Mbps (about the same as a T-3 line) to 2.48 Gbps. With the implementation of SONET, communication carriers throughout the world can interconnect their existing digital carrier and fiber optic systems.

Synchronous Digital Hierarchy (SDH) is the international equivalent of SONET and was standardized by the International Telecommunications Union (ITU). SDH is an international standard for synchronous data transmission over fiber optic cables. SDH defines a standard rate of transmission at 155.52 Mbps, which is referred to as STS-3 at the electrical level and STM-1 for SDH. STM-1 is equivalent to SONET's Optical Carrier (OC) levels-3.

In this document, a number of embodiments of the present invention are described as incorporating SONET. Although, for convenience, only SONET embodiments are explicitly described, one of skill in the art would recognize that all such embodiments may incorporate SDH and would understand how to incorporate SDH in such embodiments. Therefore, wherever SONET is used in this document, the use of either SONET or SDH is intended and the present invention is to be understood to encompass both SONET and SDH.

Figure 1:
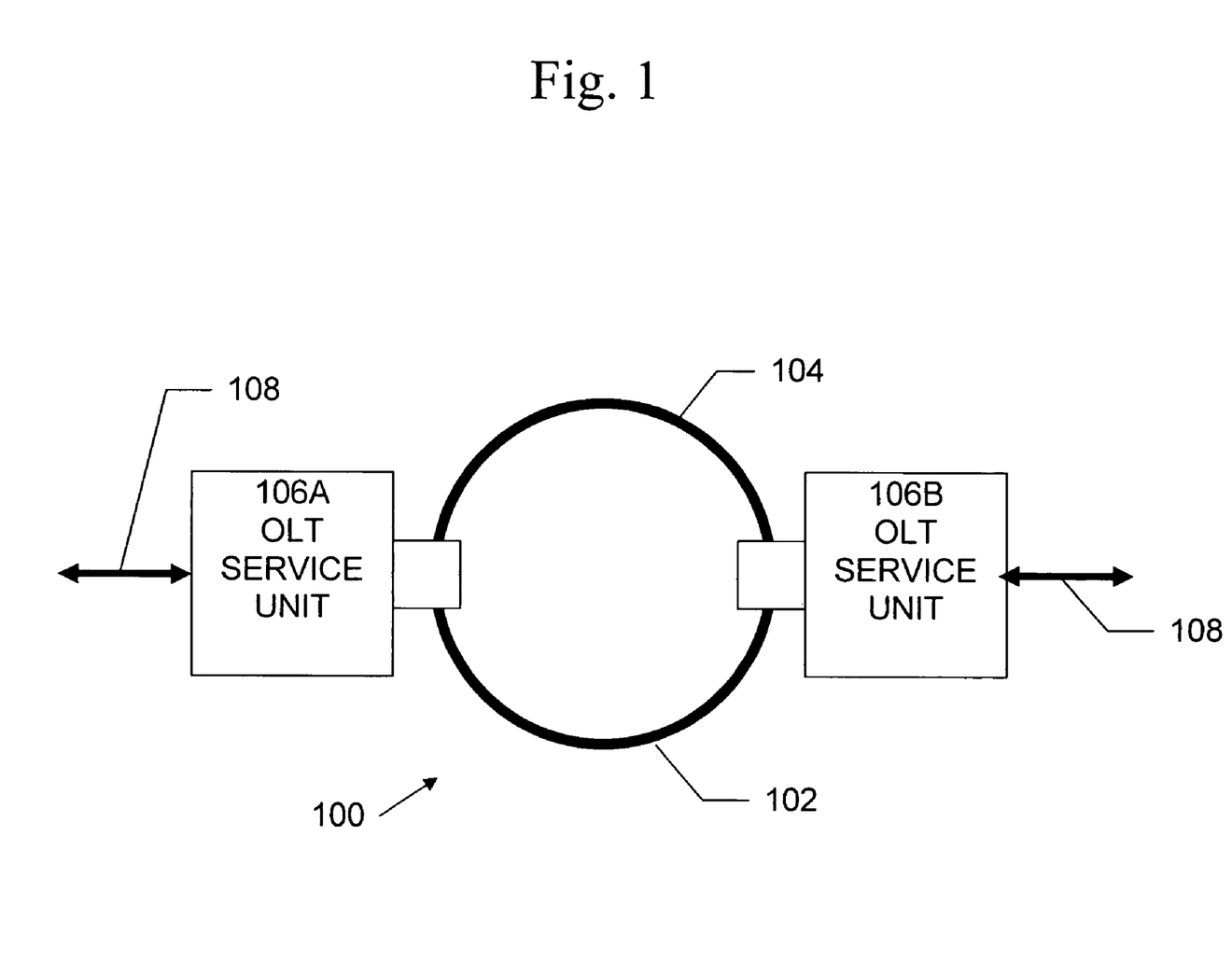
FIG. 1 is an exemplary block diagram of a SONET network in which the present invention may be implemented.

An exemplary SONET network 100, in which the present invention may be implemented, is shown in FIG. 1. SONET network 100 includes a plurality of communication paths, such as Working path 102 and Protection path 104. Typically, communication paths 102 and 104 are optical communication paths, and in particular, fiber optic communication paths, which use optical signals to carry the data traffic over the communication paths. Paths 102 and 104 are connected to a plurality of signal sources and destinations, such as Optical Line Termination Service Units (OLT SUs) 106A-B. An OLT is a SONET multiplexer and switch, which provide the interface between the other networks 108 connected to OLT SUs 106A-B and the working 102 and protection 104 paths of SONET network 100. For example, OLT SUs 106A-B may connect the working 102 and protection 104 paths of SONET network 100 to other SONET networks, other Wide Area Networks (WANs), Local Area Networks (LANs), etc.

Figure 2:
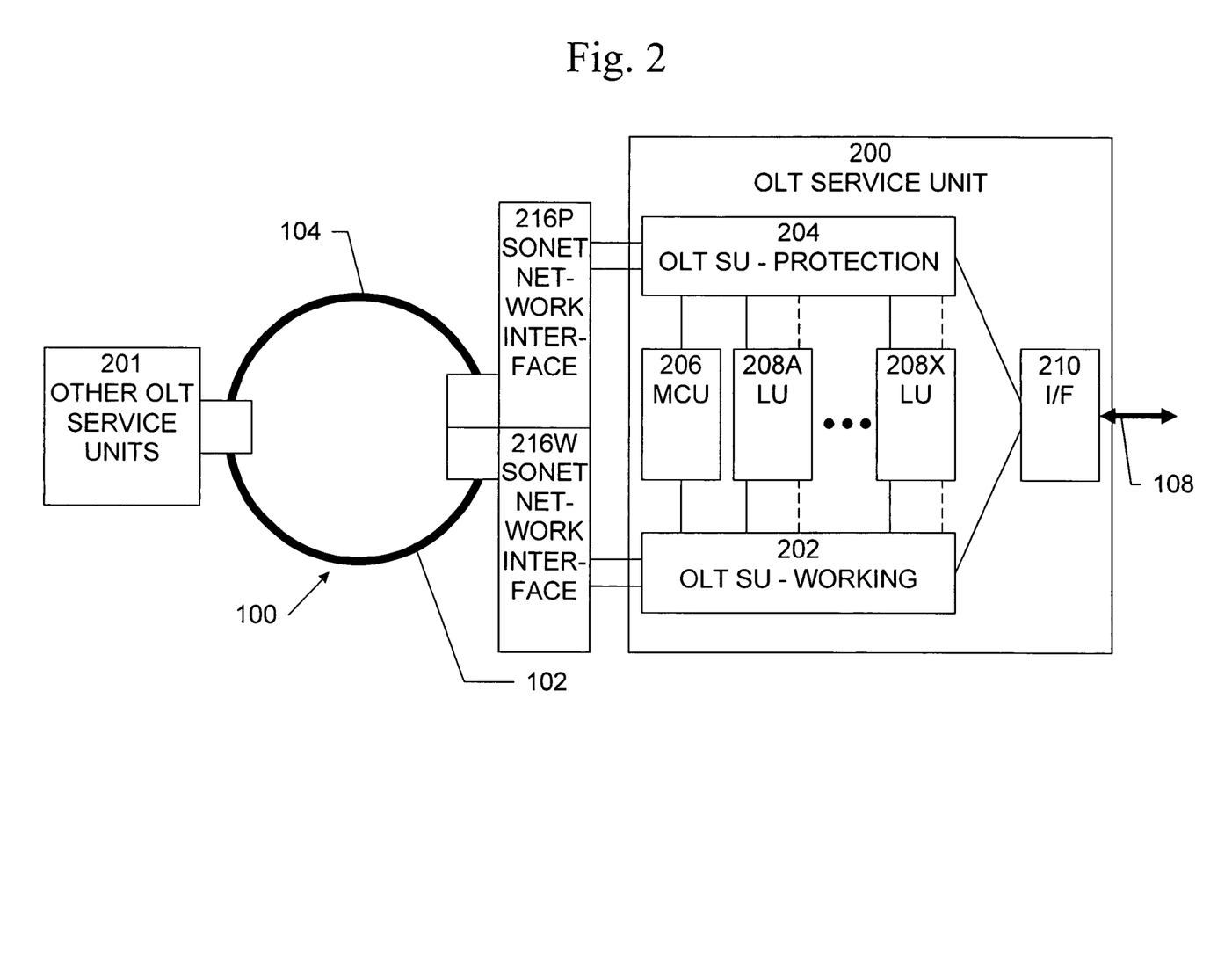
FIG. 2 is an exemplary block diagram of one embodiment of an OLT SU, which is similar to OLT SUs shown in FIG. 1.

An exemplary OLT SU 200, which is similar to OLT SUs 106A-B shown in FIG. 1, is shown in more detail in FIG. 2. As shown in FIG. 2, OLT SU 200 includes OLT SU—Working 202, OLT SU—Protection 204, Management & Control Unit (MCU) 206, a plurality of Line Units (LUs) 208A-X, and interface 210. Also shown are SONET network interface 216P, which provides the interface between OLT SU—Protection 204 and protection path 104 of SONET network 100, and SONET network interface 216W, which provides the interface between OLT SU—Working 202 and working path 102 of SONET network 100. Also connected to the working 102 and protection 104 paths of SONET network 100 are other OLT SUs 201, which perform similar functions for other portions of the overall SONET network.

OLT SU 200 provides the interface with the working and protection sides of SONET network 102. In particular, OLT SU—Protection 202 provides the interface with the protection side 104 of SONET network 100 and OLT SU—Working 204 provides the interface with the working side 102 of SONET network 100. MCU 206 provides management functions to OLT SU 200 and associated systems, via interfacing with local craft ports, SONET Digital Control Channel (DCC), and/or others. The provided functions include, for example, downloading configuration settings, collection of SONET Performance Monitoring counts, alarms and outages, and controlling protection switching. Each LU 208A-X provides timing control to access precision network clock and provides SONET frame pulse reference.

OLT interface 210 provides the interface between the other networks 108 connected to OLT SU 200 and the working 102 and protection 104 paths of SONET network 100. For example, OLT SUs 106A-B may connect the working 102 and protection 104 paths of SONET network 100 to other SONET networks, other Wide Area Networks (WANs), Local Area Networks (LANs), etc.

Figure 4:
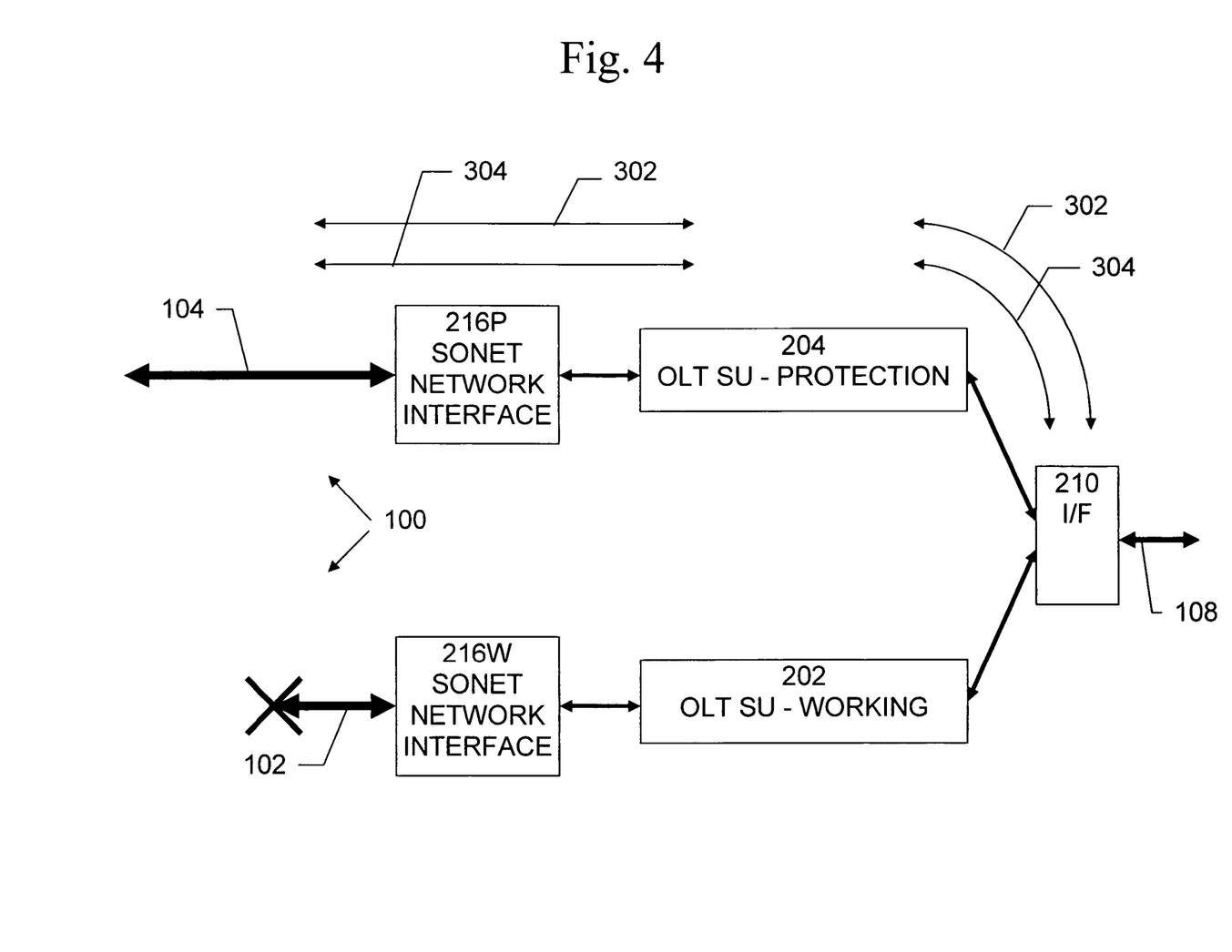
FIG. 4 is an exemplary data flow diagram of the operation of SONET network and OLT SU shown in FIG. 2 in the case of a communication path failure.
Figure 5:
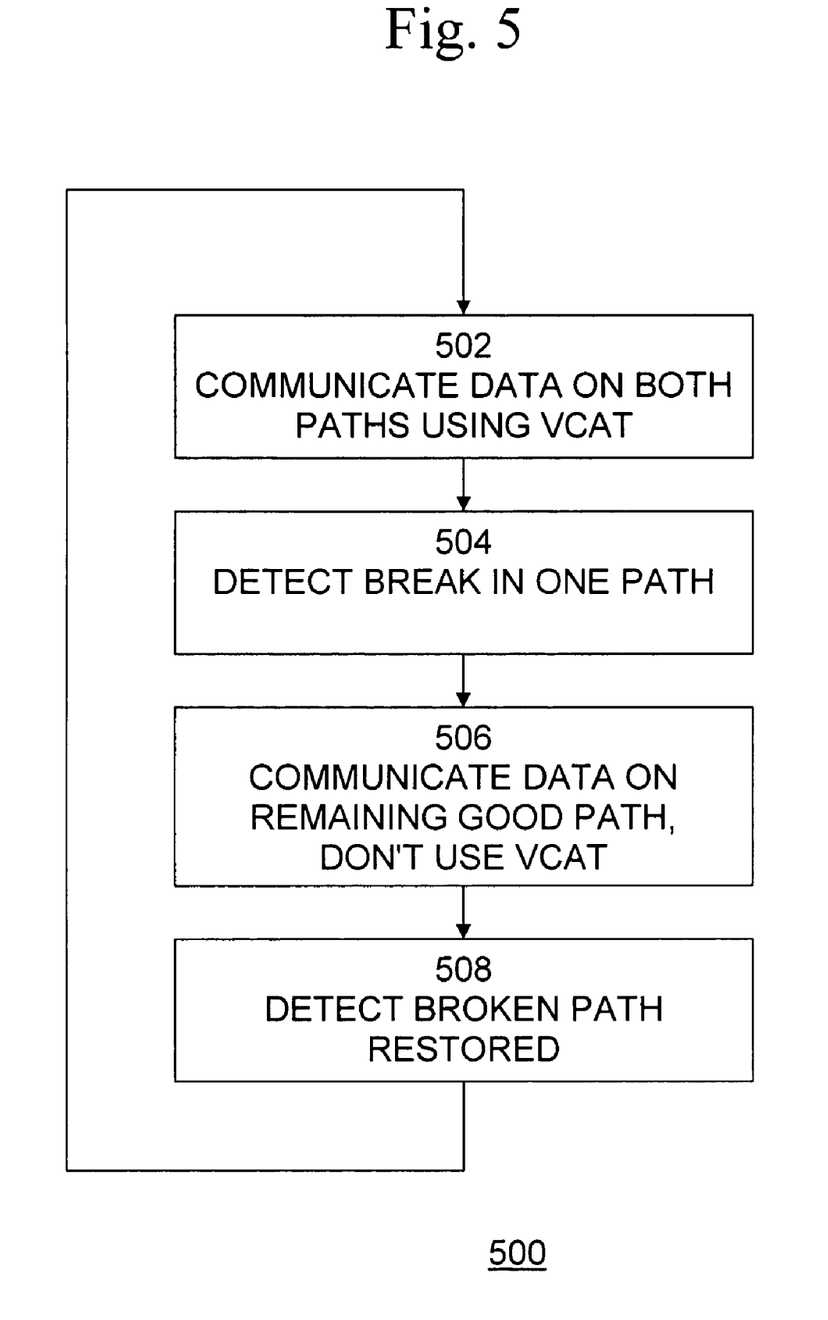
FIG. 5 is an exemplary flow diagram of a process of operation of the present invention.

Turning now to FIG. 5, a process 500 of operation of the present invention is shown. It is best viewed in conjunction with FIG. 3, which is a data flow diagram of the operation of SONET network 100 and OLT SU 200 to utilize the protecting bandwidth of SONET network 100, and with FIG. 4, which is a data flow diagram of the operation of SONET network 100 and OLT SU 200 in the case of a communication path failure.

Figure 3:
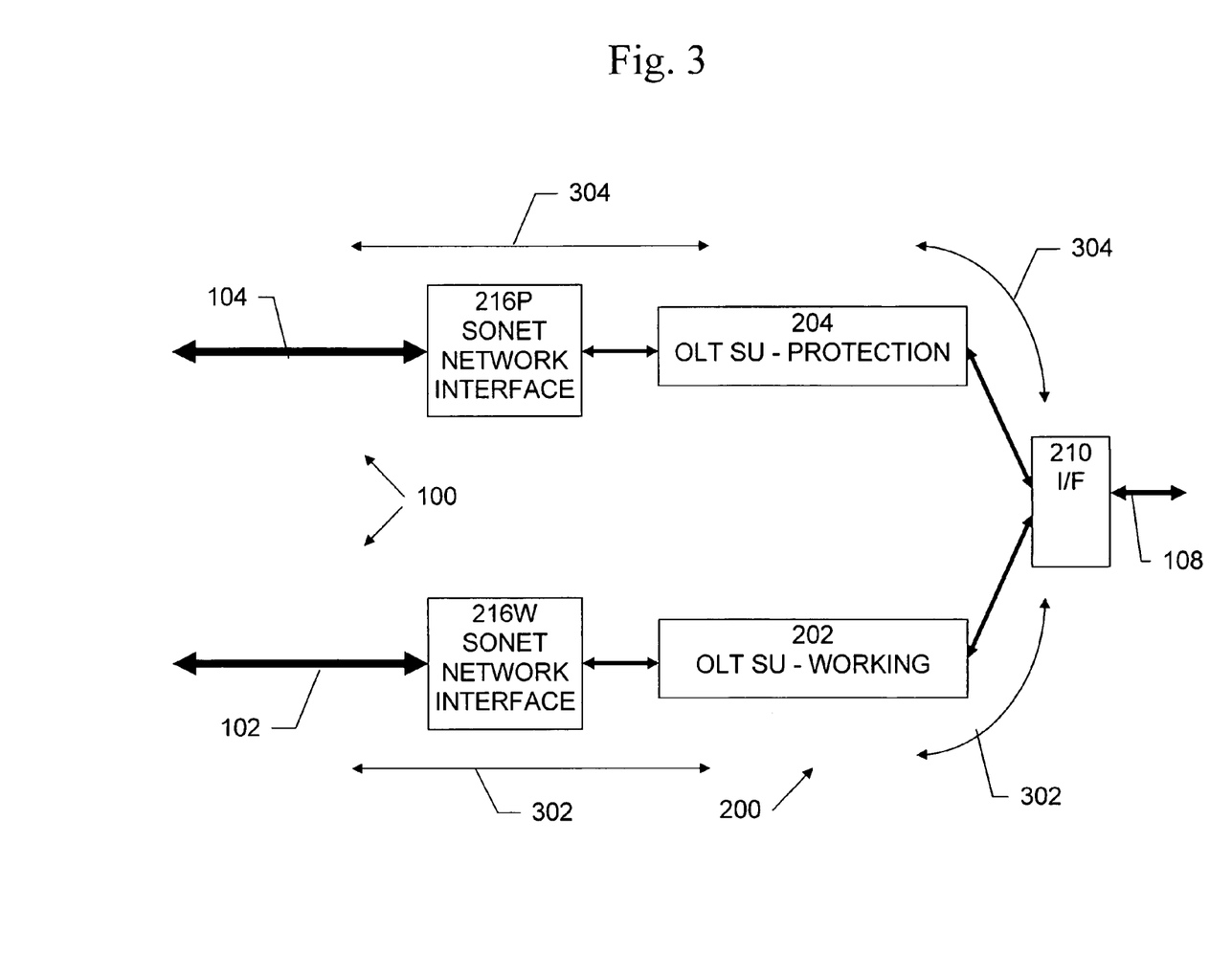
FIG. 3 is an exemplary data flow diagram of the operation of the SONET network and OLT SU shown in FIG. 2 to utilize the protecting bandwidth of SONET network.

In step 502, in the normal mode of operation, as shown in FIG. 3, OLT interface 210 communicates (receives and/or transmits) data with network 108. Data 302, which is a portion of the data communicated with network 108, is communicated with OLT SU—Working 202, while data 304, which is another, different portion of the data communicated with network 108, is communicated with OLT SU—Protection 204. Data 302 is communicated by OLT SU—Working 202 via SONET network interface 216P over Working path 102 of SONET network 100. Likewise, data 304 is communicated by OLT SU—Protection 204 via SONET network interface 216W over Protection path 104 of SONET network 100. The data is communicated using the standard virtual concatenation (VCAT) approach that is conventionally used to combine two SONET channels on the same fiber communication path into one data stream. However, the present invention uses VCAT to communicate data over two fiber communication paths.

Data can be communicated over each communication path of SONET network 100 at the full bandwidth of each communication path. For example, data 302 can be communicated over Working path 102 of SONET network 100 at the full bandwidth of Working path 102, while data 304 can be communicated over Protection path 104 of SONET network 100 at the full bandwidth of Protection path 104.

The present invention thus provides a considerable advantage over prior art networks, in which the same data is communicated over both the Working and Protection paths of the SONET network. In the present invention, each communication path is carrying different data at the full path bandwidth. Thus, the total bandwidth provided by the present invention is up to twice that provided by a prior art network.

In step 504, a break in one of the communication paths of SONET network 100 is detected. The communication path break is noted at the receiving end through AIS or LOS. The receiver then informs the sender of this fact using the LCAS protocol. The sender no longer uses Virtual Concatenation and sends frames only on the remaining operational link. The data rate is now half what it was and remains that way until the link is repaired.

In particular, referring to FIG. 4, In step 506, OLT interface 210 communicates (receives and/or transmits) data with network 108. In this case, Working path 102 of SONET network 100 has failed. Both data 302, which is a portion of the data communicated with network 108, and data 304, which is another, different portion of the data communicated with network 108, are communicated with OLT SU—Protection 204. Data 302 and 304 are communicated by OLT SU—Working 202 via SONET network interface 216P over Protection path 104 of SONET network 100. Since only one fiber communication path is used, VCAT is not used to transmit the data in the failure mode of operation. Data 302 and 304 are communicated over Protection path 104 of SONET network 100 at the full bandwidth of Protection path 104. This failure operation mode provides one half of the bandwidth of the normal mode of operation, but causes no other disruption in service. If the total bandwidth required to communicate both data 302 and data 304 is greater than the available bandwidth of Protection path 104, rate limiting or other traffic flow management may be applied to alleviate any bottleneck that occurs. However, typically, this mode of operation provides adequate service until the failed communication path is restored.

In step 508, it is detected that the broken communication path has been restored and the process loops back to step 502, in which the normal mode of operation is restored.

One of skill in the art would recognize that the failure operation mode is equally applicable to other failures that may occur. For example, if Protection path 104 fails, traffic is communicated over Working path 102. Likewise, if an OLT SU fails, traffic is communicated over the communication path having a functional OLT SU. For example, if OLT SU—Working 202 fails, traffic is communicated via OLT SU—Protection 204 over Protection path 104. Likewise if OLT SU—Protection 204 fails, traffic is communicated via OLT SU—Working 202 over Working path 102.

As described above, data 302 and data 304 are different portions of the data communicated with network 108. In some embodiments, data 302 and 304 may include distinct data traffic channels. However, in more flexible embodiments, data 302 and 304 may include any different portions of the data communicated with network 108. In such an embodiment, it is desirable to use a standard technique to separate the data communicated with network 108 into the two data portions 302 and 304 for transmission, and to recombine the two data portions 302 and 304 upon reception. For example, in the normal mode of operation, when both the working and protection communication paths are available, the network frames are sent on both communication paths one byte at a time. This aspect is the standard virtual concatenation approach usually used to combine two SONET channels on the same fiber communication path into one.

In a preferred embodiment, the separation and recombination functions are performed using a standard technique known as virtual concatenation (VCAT). VCAT breaks the integral payload into individual SONET Payload Envelopes (SPEs), separately transports each SPE and then recombines them into a contiguous bandwidth at the end point of the transmission. This type of concatenation requires concatenation functionality only at the path termination equipment. In the present invention, each SPE may be transported over either the Working path 102 or the Protection path 104, without regard to the communication path over which associated data is transported.

Figure 6:
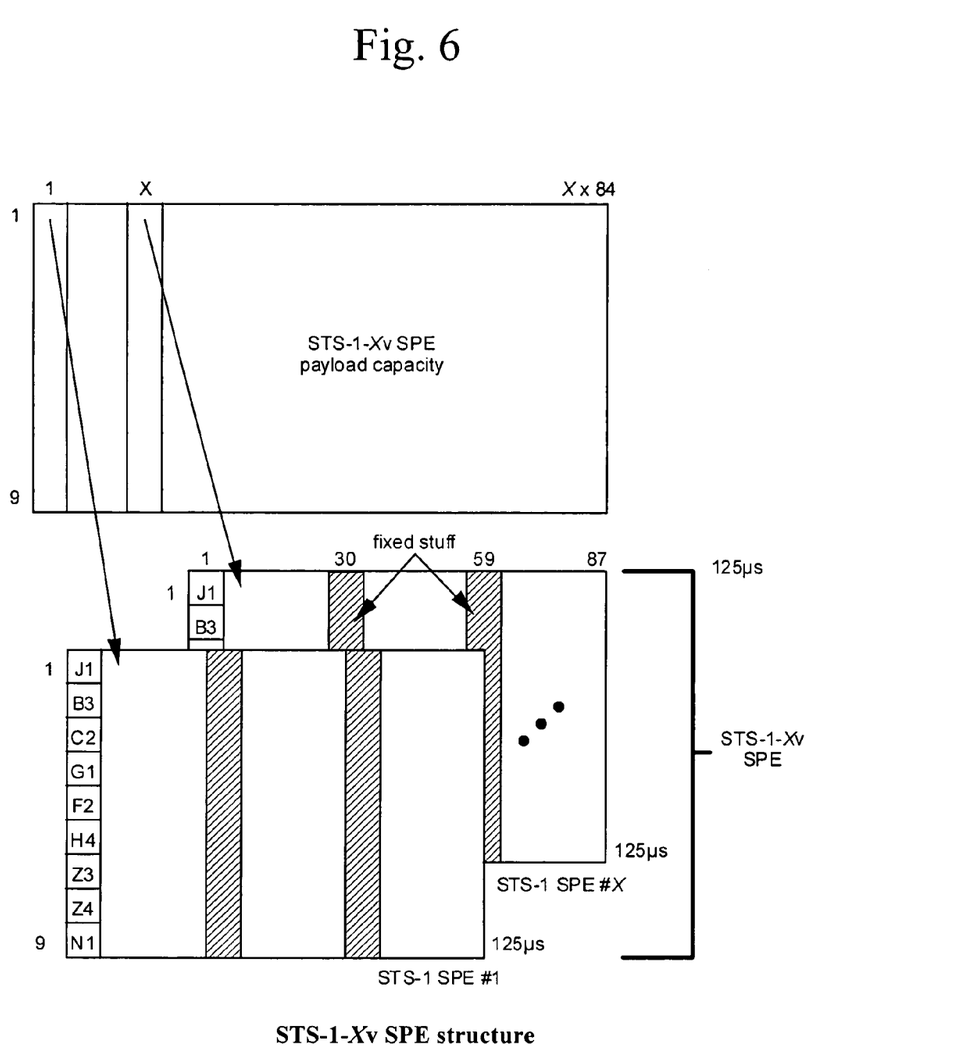
FIG. 6 is an exemplary illustration of a Virtual Concatenation STS-1-Xv SPE structure.
Figure 7:
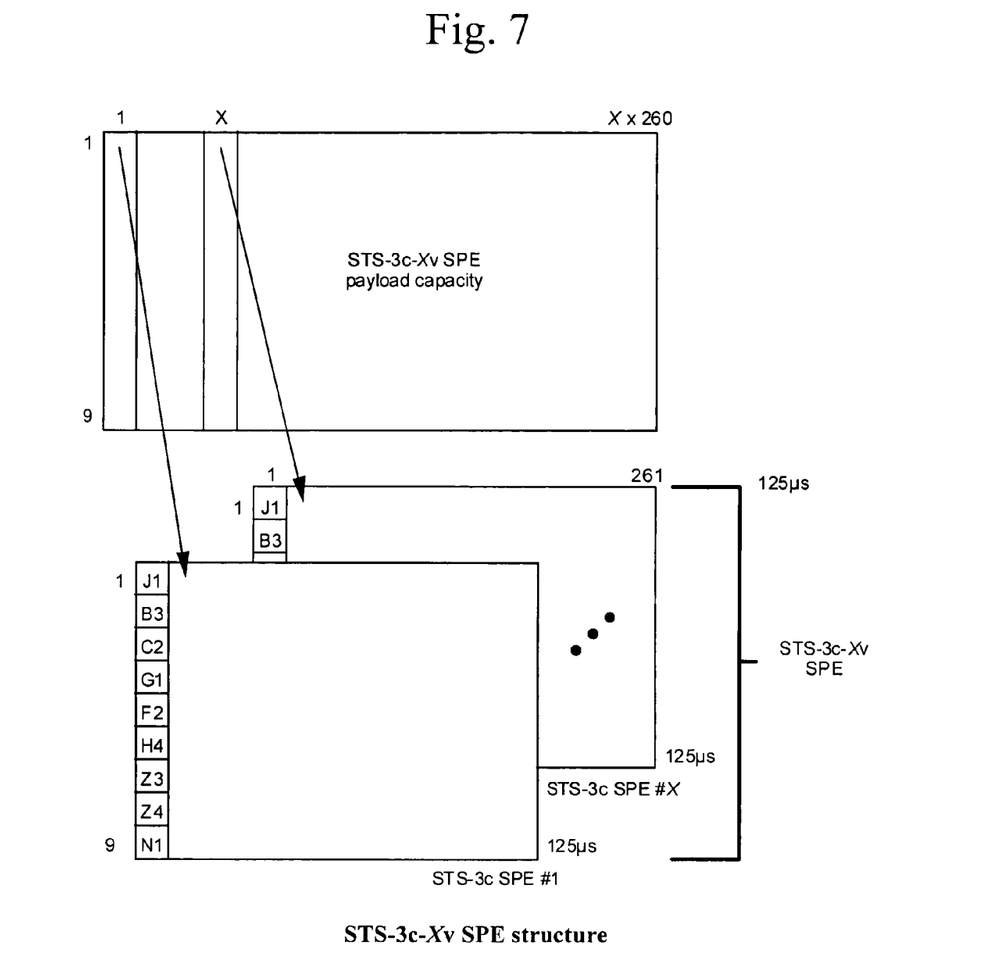
FIG. 7 is an exemplary illustration of a Virtual Concatenation STS-3c-Xv SPE structure.

Examples of the use of virtual concatenation are shown in FIGS. 6 and 7. In the example shown in FIG. 6, X STS-1/STS-3c SPEs (STS-1/3c-Xv SPE, X=1 . . . 256) are virtually concatenated. For the transport of payloads that do not fit efficiently into the standard set of synchronous payload envelopes (STS-1 and STS-Nc SPEs) virtual concatenation can be used.

An STS-1/3c-Xv SPE provides a contiguous payload area of X STS-1/3c SPE with a payload capacity of X*48384/149760 kbit/s as shown in FIGS. 6 and 7. The payload capacity is mapped into X individual STS-/3cl SPEs which form the STS-1/3c-Xv SPE. Each STS-1/3c SPE has its own Path Overhead (POH), which is overhead data assigned to and transported with the payload until the payload is demultiplexed. POH is used for functions that are necessary to transport the payload. The H4 POH byte is used for the virtual concatenation specific sequence and multi-frame indication as defined below. In FIG. 6, note that for ease of inter-working with SDH VC-3 signals, columns 30 and 59 of the STS-1 SPE contain fixed stuff.

Each STS-1/3c SPE of the STS-1/3c-Xv SPE is transported individually through the network. Due to different propagation delay of the STS-1/3c SPEs a differential delay will occur between the individual STS-1/3c SPEs. This differential delay has to be compensated and the individual STS-1/3c SPEs have to be realigned for access to the contiguous payload area. The realignment process has to cover at least a differential delay of 125 µs.

Each STS-1/3c SPE of the STS-1/3c-Xv SPE is transported individually through the network. Due to different propagation delay of the STS-1/3c SPEs a differential delay will occur between the individual STS-1/3c SPEs. This differential delay has to be compensated and the individual STS-1/3c SPEs have to be realigned for access to the contiguous payload area. The realignment process has to cover at least a differential delay of 125 μs.

Figure 8:
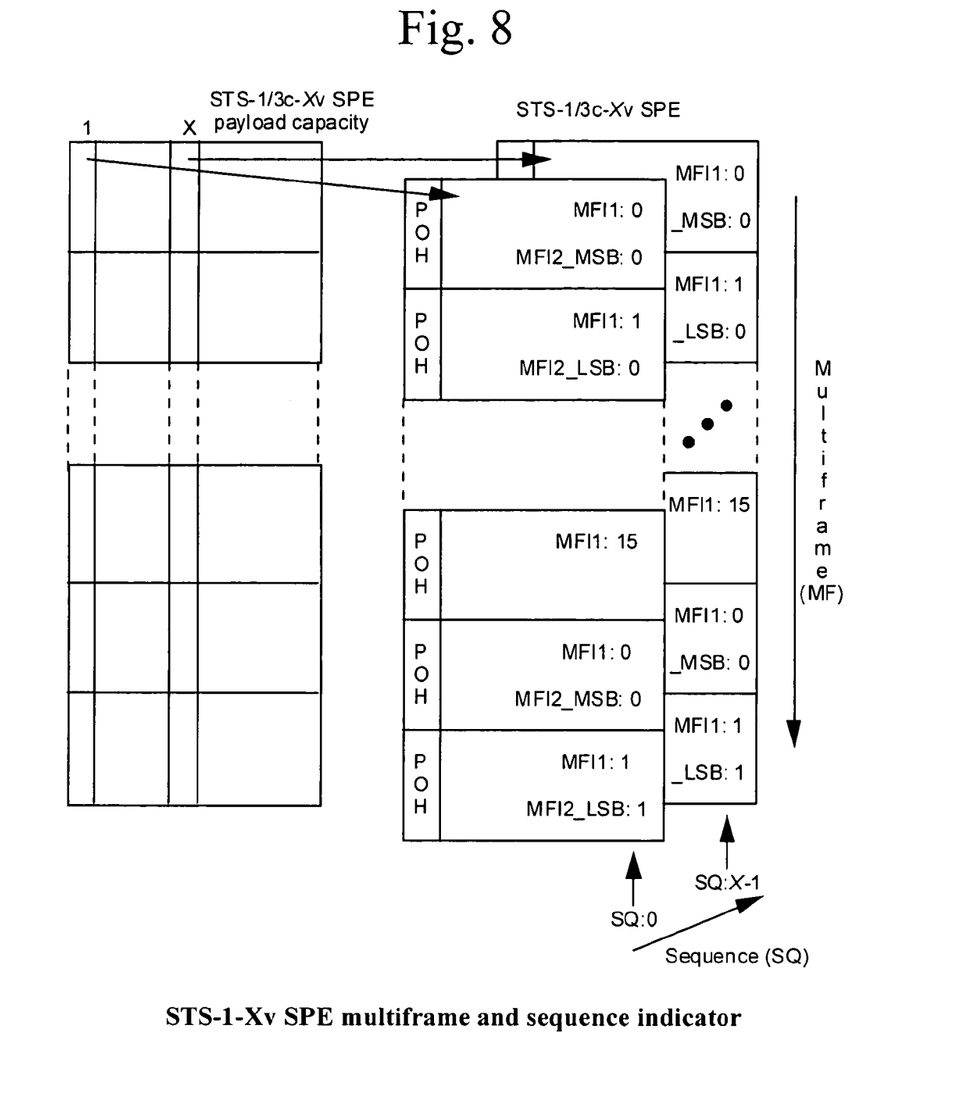
FIG. 8 is an exemplary illustration of a Virtual Concatenation STS-1-Xv SPE multiframe and sequence indicator.
Figure 9:
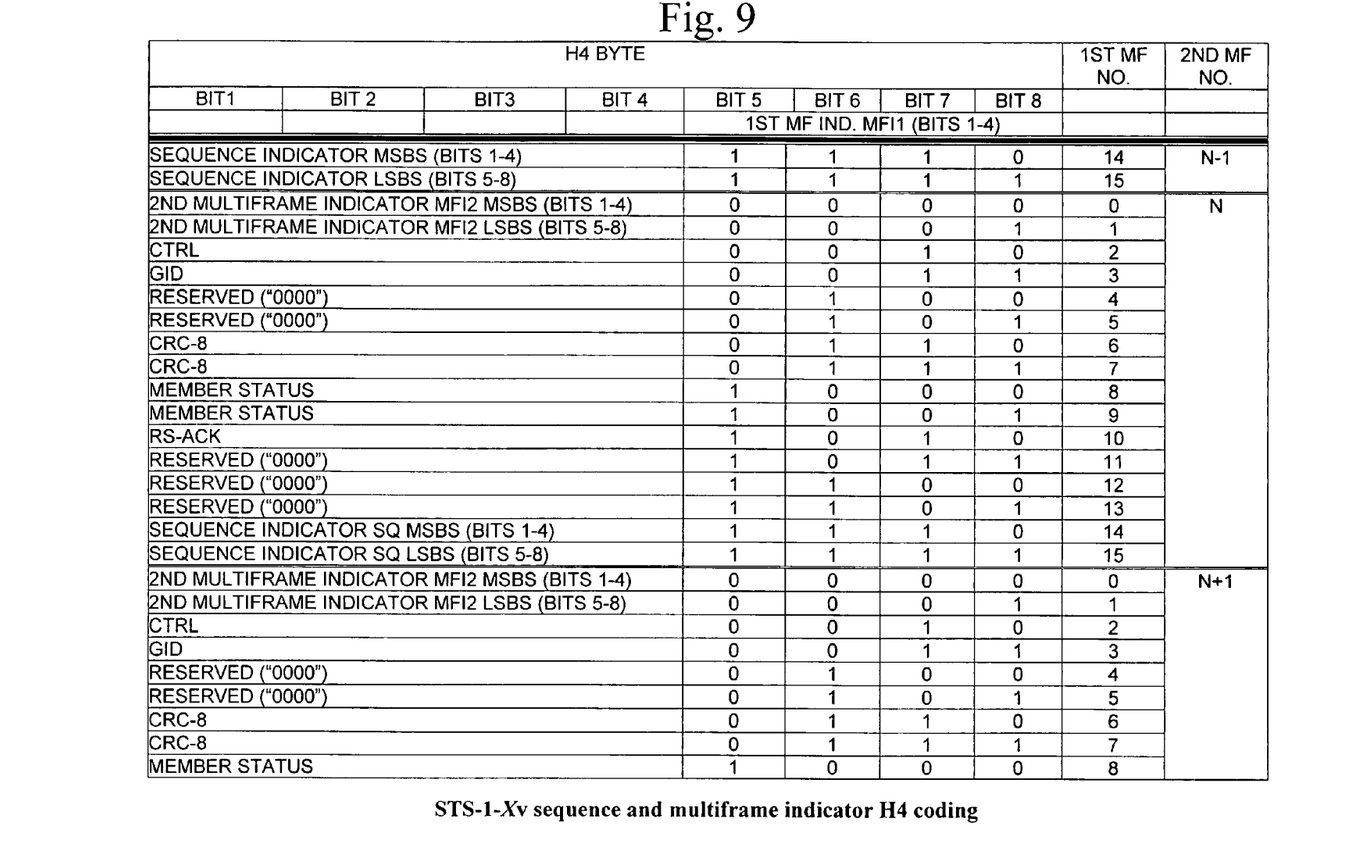
FIG. 9 is an exemplary illustration of Virtual Concatenation STS-1-Xv sequence and multiframe indicator H4 coding.

The sequence indicator SQ identifies the sequence/order in which the individual STS-1/3c SPEs of the STS-1/3c-Xv SPE are combined to form the contiguous STS-1/3c-Xc SPE payload capacities shown in FIG. 8. Each STS-1/3c SPE of a STS-1(3c-Xv SPE has a fixed unique sequence number in the range of 0 to (X-1). The STS-1/3c SPE transporting the first time slot of the STS-1/3c-Xc SPE has the sequence number 0, the STS-1/3c SPE transporting the second time slot the sequence number 1 and so on up to the STS-1/3c SPE transporting time slot X of the STS-1/3c-Xc SPE with the sequence number (X-1). The sequence number is fixed assigned and not configurable. It allows the service provider to check the correct constitution of the STS-1/3c-Xv SPE without using the trace. The 8-bit sequence number (which supports values of X up to 256) is transported in bits 1 to 4 of the H4 bytes, using frame 14 (SQ bits 1-4) and 15 (SQ bits 5-8) of the first multi-frame stage as shown in FIG. 9.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for communicating data over a Synchronous Optical Network/Synchronous Digital Hierarchy, the system comprising:
    an Optical Line Termination unit operable to:
        interface with a plurality of Synchronous Optical Network/Synchronous Digital Hierarchy communication paths,
        communicate a portion of data of a communication over the Synchronous Optical Network/Synchronous Digital Hierarchy on a first communication path of the plurality of Synchronous Optical Network/Synchronous Digital Hierarchy communication paths employing the entire bandwidth of the first communication path to communicate the data of the communication over the Synchronous Optical Network/Synchronous Digital Hierarchy;
        communicate a different portion of the data of the same communication over the Synchronous Optical Network/Synchronous Digital Hierarchy on a second communication path of the plurality of Synchronous Optical Network/Synchronous Digital Hierarchy communication paths employing the entire bandwidth of the second communication path to communicate the different data of the communication over the Synchronous Optical Network/Synchronous Digital Hierarchy; wherein the portion of the data of the communication over the Synchronous Optical Network/Synchronous Digital Hierarchy and the different portion of the data of the same communication over the Synchronous Optical Network/Synchronous Digital Hierarchy are communicated simultaneously; and
        communicate the portion of the data of the communication over the Synchronous Optical Network/Synchronous Digital Hierarchy and the different portion of the data of the same communication over the Synchronous Optical Network/Synchronous Digital Hierarchy on the first communication path employing the entire bandwidth of the first communication path when a break is detected in the second communication path, wherein when the first communication path is a working path the second communication path is a protection path and when the first communication path is a protection path the second communication path is a working path.

2. The system of claim 1, wherein the data of the communication over the Synchronous Optical Network/Synchronous Digital Hierarchy and the different data of the communication over the Synchronous Optical Network/Synchronous Digital Hierarchy are communicated when a break is detected without using virtual concatenation.

3. The system of claim 1, wherein the first communication path in the plurality of Synchronous Optical Network/Synchronous Digital Hierarchy communication paths comprise a protection path and the second communication path in the plurality of Synchronous Optical Network/Synchronous Digital Hierarchy communication paths comprise a working path.

4. A method of communicating data over a Synchronous Optical Network/Synchronous Digital Hierarchy comprising:
    interfacing with a plurality of Synchronous Optical Network/Synchronous Digital Hierarchy communication paths,
    communicating a portion of the data of a communication over the Synchronous Optical Network/Synchronous Digital Hierarchy on a first communication path of the plurality of Synchronous Optical Network/Synchronous Digital Hierarchy communication paths employing the entire bandwidth of the first communication path to communicate the data of the communication over the Synchronous Optical Network/Synchronous Digital Hierarchy;
    communicating a different portion of the data of the same communication over the Synchronous Optical Network/Synchronous Digital Hierarchy on a second communication path of the plurality of Synchronous Optical Network/Synchronous Digital Hierarchy communication paths employing the entire bandwidth of the second communication path to communicate the different data of the communication over the Synchronous Optical Network/Synchronous Digital Hierarchy; wherein the portion of the data of the communication over the Synchronous Optical Network/Synchronous Digital Hierarchy and the different portion of the data of the same communication over the Synchronous Optical Network/Synchronous Digital Hierarchy are communicated simultaneously; and
    communicating the portion of the data of the communication over the Synchronous Optical Network/Synchronous Digital Hierarchy and the different portion of the data of the same communication over the Synchronous Optical Network/Synchronous Digital Hierarchy on the first communication path employing the entire bandwidth of the first communication path when a break is detected in the second communication path, wherein when the first communication path is a working path the second communication path is a protection path and when the first communication path is a protection path the second communication path is a working path.

* * * * *